Oct. 2, 1923.  
G. H. W. LINDHORST  
TIRE  
Filed Oct. 27, 1922

G. H. W. Lindhorst
INVENTOR

BY Victor J. Evans
ATTORNEY

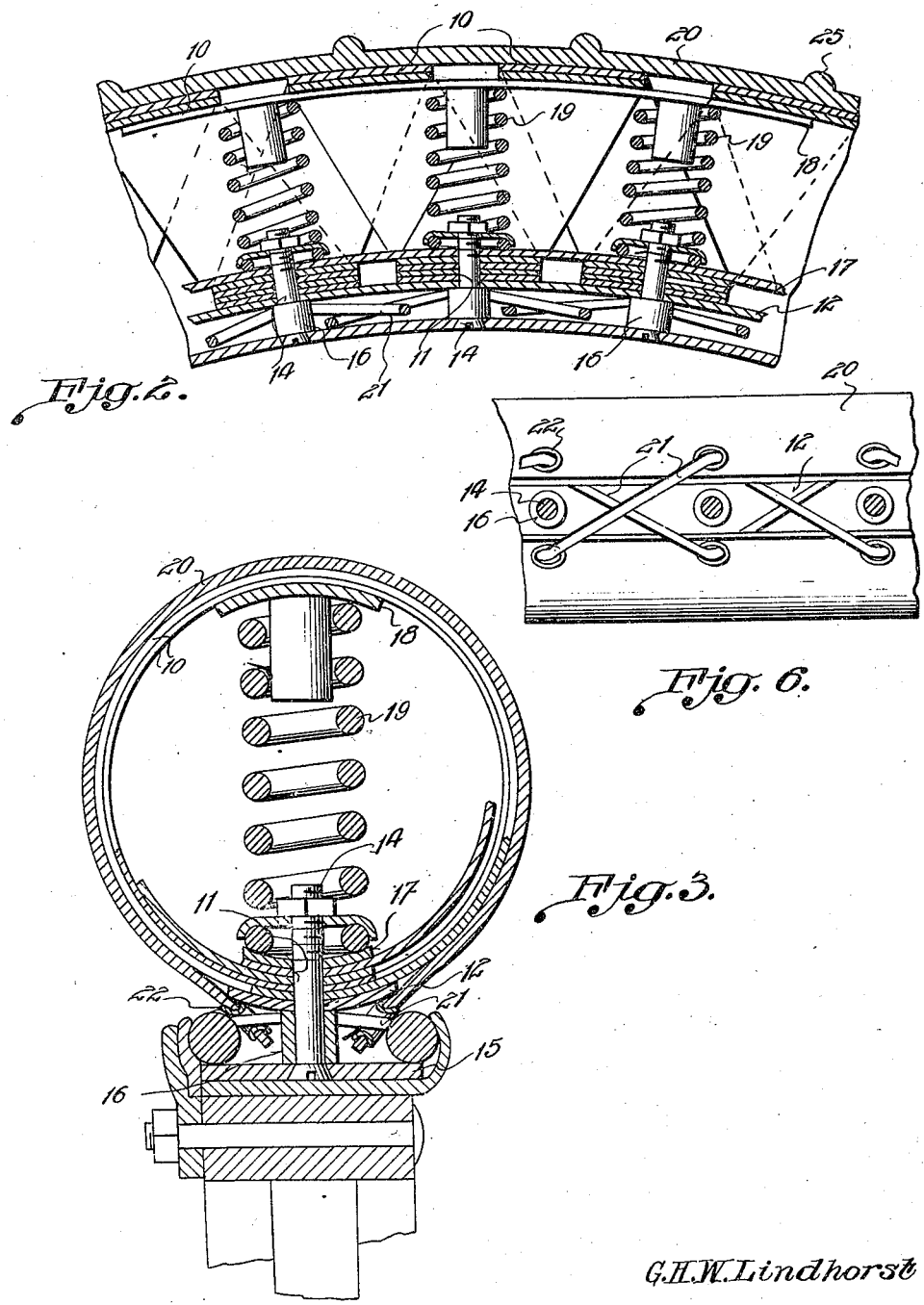

Patented Oct. 2, 1923.

1,469,670

UNITED STATES PATENT OFFICE.

GEORGE H. W. LINDHORST, OF GRACE, MONTANA.

TIRE.

Application filed October 27, 1922. Serial No. 597,339.

*To all whom it may concern:*

Be it known that I, GEORGE H. W. LINDHORST, a citizen of the United States, residing at Grace, in the county of Silver Bow and State of Montana, have invented new and useful Improvements in Tires, of which the following is a specification.

This invention has for its object, the provision of an automobile tire made up of a plurality of metal sections arranged to unitedly form a tire casing, and in which casing is arranged resilient means for affording the tire the desired cushioning action, and at the same time dispensing with the use of a pneumatic inner tube.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is an enlarged fragmentary sectional view therethrough.

Figure 3 is a transverse sectional view taken on line 3—3 of Figure 1.

Figure 6 is a fragmentary view showing the manner in which the flexible casing is laced together.

Figure 1:
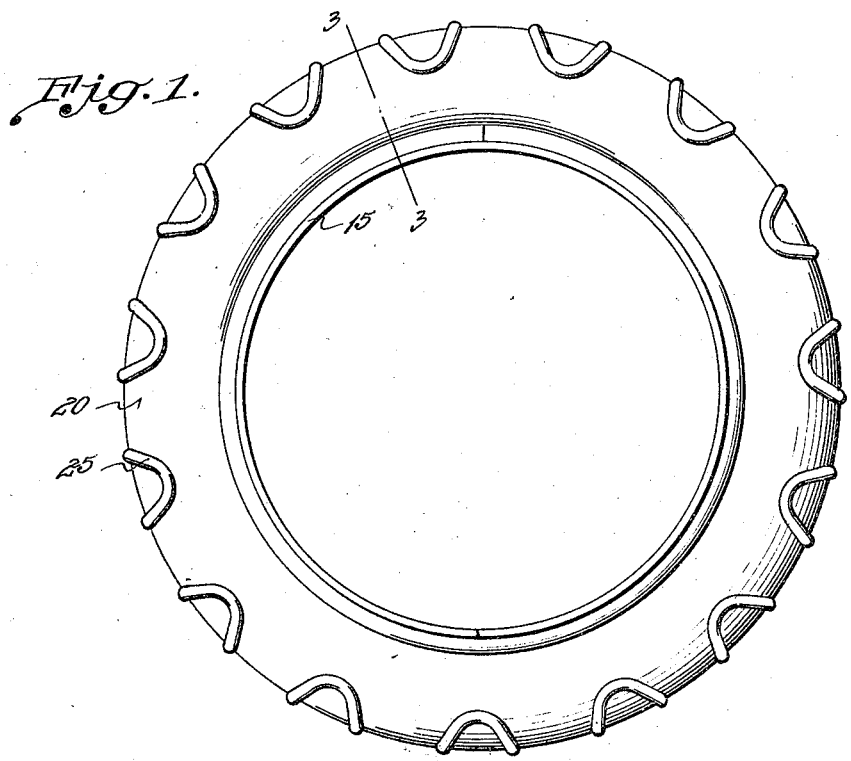
Figure 1 is a side elevation of a tire constructed in accordance with the present invention.
Figure 4:
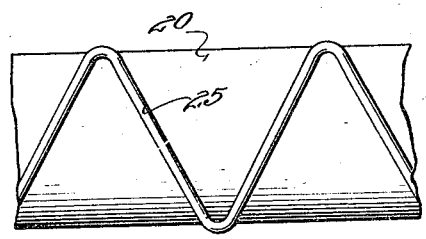
Figure 4 is a fragmentary plan view of the tire shown in Figure 1.
Figure 5:
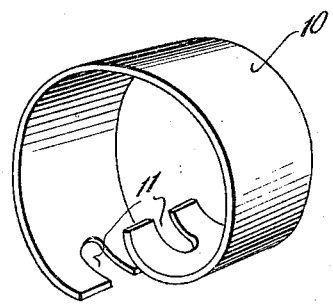
Figure 5 is a perspective view of one of the metallic sections.

The tire forming the subject matter of the present invention is made up of a plurality of metallic annular-shaped members 10, the free ends of which are provided with slots 11, which receive the fastening means for associating the metallic annular-shaped members with a metallic band 12. The members 10 are arranged end to end in the formation of a tire casing as shown, and the fastening elements 14 which associate these members with the band 12, also associates the band with the tire carrying rim 15. The fastening elements pass through tubular members 16, which are interposed between the band 12, and the tire carrying rim, spacing said parts.

Arranged within the tire casing defined by the metallic members 10, are spaced concentrically disposed bands 17 and 18 respectively, and have associated therewith coiled springs 19. These springs are arranged between the bands 17 and 18 and supply the tire with all the desired resiliency, and make it possible to dispense with the use of a pneumatic inner tube. Consequently, all tire trouble resultant from tire trouble and punctures incident to the use of a pneumatic tube is done away with.

The metallic tire casing is covered by a flexible casing 20, which may be constructed from any suitable material, and the casing is preferably secured to the structure by means of leather strips 21, which are passed through eyelets 22 along the edges of the casing, and passed about the tubular members above referred to, which space the band 12 from the tire carrying rim. If desired, the flexible casing may be provided with anti-skid devices 25, which are arranged to extend transversely across the tread of the casing, and which devices are preferably in the nature of leather or rope pieces stitched or otherwise suitably secured to the said casing.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. The combination with a tire carrying rim, of a tire including a circumferential series of elements projecting from the rim, a casing made up of a plurality of metallic members arranged end to end, each member being of annular formation, and split, the adjacent ends of each member being notched to receive the adjacent element projecting from the rim, with said ends overlapped, coiled springs arranged within the tire casing and a non-metallic casing cover the metallic casing.

2. The combination with a tire carrying rim, of a circumferential series of elements radiating from the rim, a casing made up of a plurality of metallic annular shaped members arranged end to end, each member being split and having its free ends notched to receive the adjacent element carried by the rim, spaced concentrically arranged bands disposed within the tire casing, coiled springs interposed between said bands and holding the latter spaced apart, means connecting the corresponding ends of said springs to the adjacent elements carried by said rim, and a non-metallic casing covering the metallic casing.

In testimony whereof I affix my signature.

GEORGE H. W. LINDHORST.